Figure 1:
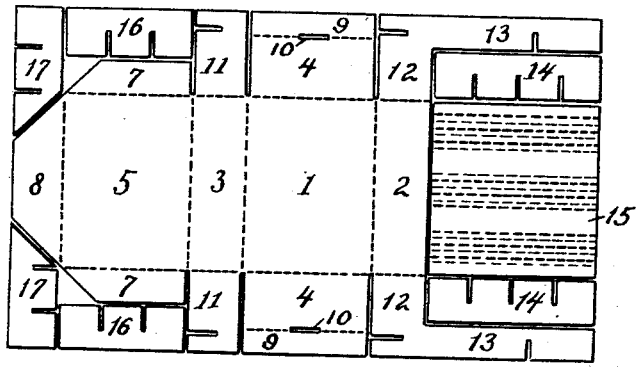

(No Model.)

S. F. SHERMAN.
FOLDING BOX.

3 Sheets—Sheet 1.

No. 520,341.

Patented May 22, 1894.

Witnesses:
Samuel W. Balch
H. A. Whitman

Inventor,
Stephen F. Sherman,
by Thomas Ewing, Jr.
Attorney (No Model.) 3 Sheets—Sheet 2.
S. F. SHERMAN.
FOLDING BOX.
No. 520,341. Patented May 22, 1894.
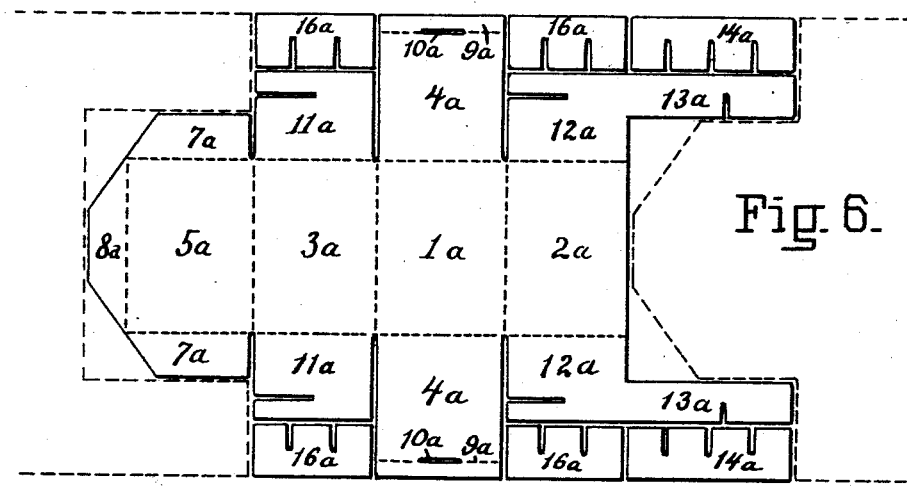
Fig. 6.
Fig. 7
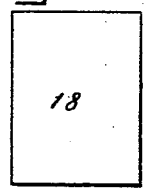
Fig. 8.
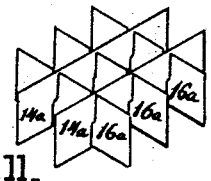
Fig. 11.
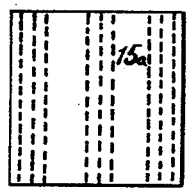
Fig. 10
Fig. 9.
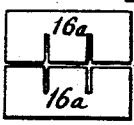
Fig. 12.
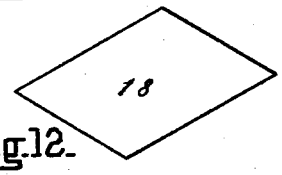
Fig. 13.
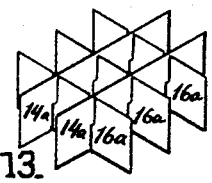
Fig. 14.
Fig. 15.
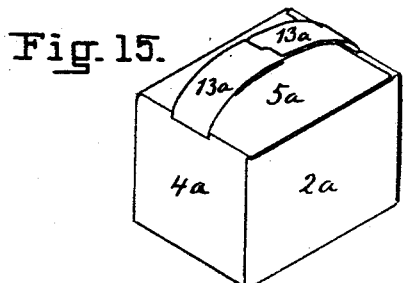
Witnesses:
Samuel W. Balch
H. H. Whitman
Inventor,
Stephen F. Sherman,
by Thomas Ewing, Jr.
Attorney.

(No Model.)　　　　　　　　　S. F. SHERMAN.　　　　3 Sheets—Sheet 3.
FOLDING BOX.

No. 520,341.　　　　　　　　　　　　Patented May 22, 1894.

Witnesses=
Samuel W. Balch
Hy H Whitman

Inventor,
Stephen F. Sherman,
by Thomas Ewing, Jr.
Attorney

UNITED STATES PATENT OFFICE.

STEPHEN F. SHERMAN, OF NEWARK, NEW YORK.

FOLDING BOX.

SPECIFICATION forming part of Letters Patent No. 520,341, dated May 22, 1894.

Application filed March 16, 1894. Serial No. 503,831. (No model.)

*To all whom it may concern:*

Be it known that I, STEPHEN F. SHERMAN, a citizen of the United States of America, residing at Newark, Wayne county, New York, have invented certain new and useful Improvements in Folding Boxes, of which the following is a specification.

My invention consists in certain novel features pertaining to folding-boxes and blanks therefor, being particularly adapted for packing eggs but serviceable for other purposes. The blanks may be cut at single impressions from suitable flexible sheet material, preferably paper. Cuts and creases divide the blank into suitable sections to form the four sides and bottom in the customary way. To certain of these fundamental sections I add extensions which may be folded over to form handles, and which engage with certain other sections, in such manner as to transfer the strain from the handles directly to the bottom of the box so that while being carried the box keeps it shape. In addition to these sections I have added sections which form a suitable cover. In all the forms herein shown care is taken to avoid waste of material as far as practicable by proper arrangement and shaping of the sections. It will be seen from the following description that these boxes are so constructed that they are securely held together without glue, tacks or fasteners. The principal object is to make a box of such shape and so constructed that it will serve to carry eggs from the farm to the retailer and will also be suitable for delivery to the consumer, so that the eggs will not have to be repacked by the retailer. In order to accomplish this it is necessary that the parts of the box should be well locked together, that the eggs should be protected from breaking both at the bottom and the top, and that the boxes should be able to sustain sufficient weight to enable them to be packed well one on top of the other in suitable shipping crates. The crate which I intend to use is that shown in my United States patent, No. 517,413, for knock-down crates, issued March 27, 1894.

In the accompanying three sheets of drawings there are illustrated three boxes each of which embodies my broad invention but which differ from each other somewhat in detail.

Figure 2:
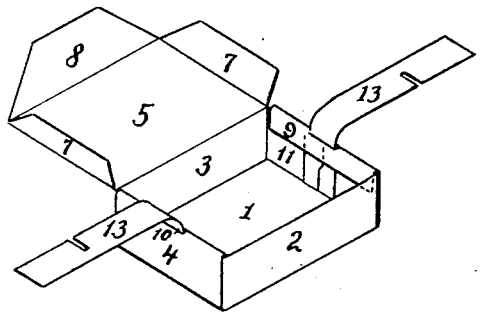
Figure 3:
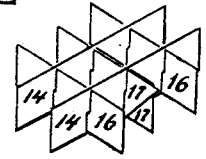
Figure 4:
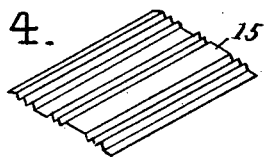
Figure 5:
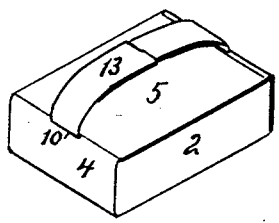
Figure 16:
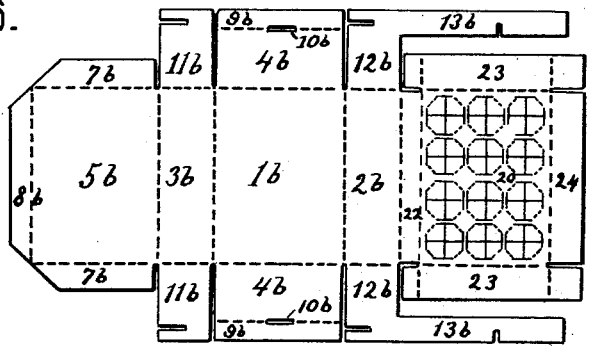
Figure 17:
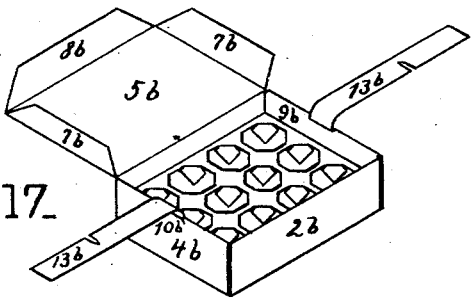
Figure 18:
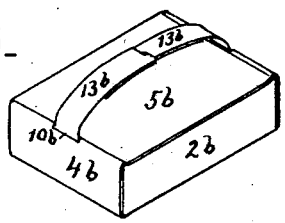

Figure 1 is a plan of a blank which with almost no waste provides every part of the box. Fig. 2 shows the box made from this blank, with the lid thrown back. Fig. 3 shows the interior crate which divides up the space within the box into sections for the eggs, there being a dozen of the sections provided. Fig. 4 is a corrugated strip of paper to form a false bottom for the box. The egg crate of Fig. 3 rests upon this false bottom. Fig. 5 shows the box when closed with the handles hooked across the top. Fig. 6 is a plan of a blank for a box, somewhat differently arranged. This blank does not provide for all the parts of the box. Figs. 7, 8, 9, and 10, show the additional parts necessary to make up the box. Figs. 11, 12, 13, and 14, show the parts that go in the box, the box being two storied, and the corrugated bottom, Fig. 14 going in first, then an egg crate such as is shown in Fig. 13, then a shelf such as is shown in Fig. 12, which may be corrugated, and on top of all a second egg crate such as is shown in Fig. 11. There is no difference between the crates of Figs. 11 and 13. Fig. 15 shows the box closed with the handles hooked across the top. Fig. 16 shows another form of a blank for making up a box. Fig. 17 is a view of the box, with the lid thrown back. Fig. 18 is a view of the box when closed and the handle clasped across the top. All of these figures are drawn so as to appear in the patent, one-eighth of the size of the actual boxes and blanks.

Referring now to the box of Sheet 1, Figs. 1 to 5, it is, as before stated, intended to hold one dozen of eggs. The size should be about seven inches by five and one-fourth on the bottom by two and one-fourth in height. The blank is creased at the dotted lines and cut through at the points where the parts are shown as severed from each other. All of the creases of the main blank are on the same side of the sheet since all the folds are the same way. The creases on part 15 are on both sides since this is corrugated. The creases on one side are indicated by heavy dotted lines and those on the other side by light dotted lines. The bottom section 1 is rectangular in shape. There are two side sections 2 and 3 and two end sections 4 4. A top section 5 is attached to the side section 3. This section is preferably provided with edge flaps 7 7 and a front flap 8. From the end sections there extends two folding over strips 9 9, there being slits 10 10 cut at the centers of the creases between the sections and the strips. Corner sections 11 11 extend laterally from the side section 3. These are both nicked so as to engage with correspondingly nicked corner sections 12 12 extending laterally from the side section 2. Sections 13 13 to form handles project from these last named corner sections and they extend from them evenly with their outer edges in the manner shown in the drawings. The handle sections are nicked so as to lock into each other. The material between these two handle sections 13 is cut into three longitudinal strips, two narrow ones 14 14 being nicked to form the two long elements of the egg crate, and one broad one 15 being creased on both sides to form a corrugated false bottom. The rest of this egg crate is made up of two nicked cross pieces 16 16 and two nicked end pieces 17 17 that separately form each an incomplete cross piece of this crate, each lacking a corner, but together when reversed in position form a stout middle cross piece. As will be seen the nicks on these two pieces 17 are cut from opposite sides so that when laid on each other with the nicks coinciding each will cover the other's incomplete corner, as shown in Fig. 3. To make up the box from the pieces shown in Fig. 1 the side folds 2 and 3 are first turned up and the two pairs of corner sections 11 and 12 are hooked together. The end pieces 4 are then turned up and the handle sections 13 13 are slipped through the slits 10 10. The two folding over sections are then turned down so that they lie within the box. These operations form the box as illustrated in Fig. 2. This shows the box perfectly locked. The sides 2 and 3 cannot bend outward because they are locked by the pairs of flaps 11 and 12. And they cannot collapse because the sections 9 9 and corner sections 11 and 12 prevent them from doing so. The end sections 4 can neither be pushed outward nor collapsed because they are locked by the handles 13 13 close up against the corner sections. Since the sections 9 9 have to fold over the corner sections 11 and 12, the width of the end sections should be a little greater than the width of the side sections, as the drawings show. The corrugated bottom 15 is then laid in place, and acts as a cushion for the eggs to rest on and prevent their breakage. The egg crate is made up from the pieces 14, 16, and 17, in the manner shown in Fig. 3, and placed on the corrugated bottom. The box is then filled with eggs, one egg being placed in each rectangular section formed by the egg crate, and the side and end flaps 7 and 8 of the top 5 are folded in and the top is closed down. The top is supported by the upper edges of the pieces which form the egg crate or by the end flap 8 which rests upon the bottom of the box, or both. The handle strips are then laid across the top of the box but not interlocked when it is packed in the shipping crate.

Referring now to the box illustrated in Sheet 2, this differs from that shown in Sheet 1, mainly in that, it is intended to be of proportions enlarged to make it a double decked box, and in that there is a little different location of the handle sections and egg crate sections. It is not necessary to explain the location of the different sections, further than to say that sections $1^a\ 2^a\ 3^a\ 4^a\ 5^a\ 7^a\ 8^a\ 9^a\ 11^a\ 12^a\ 13^a\ 14^a\ 16^a$ correspond in the functions and in shape to the similar parts to the parts of Fig. 1, marked 1 2 3 4 5 7 8 9 11 12 13 14 and 16, respectively.

Dotted lines at each end of the main blank show how successive blanks may be cut from the same roll without waste of material, except just at the corners of each top section. The other dotted lines which are shown on the blank indicate its creases to facilitate bending. These creases are as before all on one side since all the folds are on the same side of the blank.

The parts shown in Figs. 7, 8, 9 and 10 are made out of separate pieces of paper, and may be made of cheaper material than is required for the box itself.

To put the box together it is first folded into the shape similar to that of Fig. 2. The corrugated bottom shown in Fig. 14 is then laid in place, then an egg crate such as is shown in Fig. 13 is placed on the bottom, and filled with eggs, then a rectangular flat piece 18 such as is shown in perspective in Fig. 12 is laid on top of the egg crate as a shelf, then a second egg crate is laid on top of that and filled with eggs and the box lid is closed down, as before. The handles are then laid across the top of the box for shipping as with the box already described.

Referring now to the box illustrated in Figs. 16, 17 and 18 in Sheet 3 the sections $1^b\ 2^b\ 3^b\ 4^b\ 5^b\ 7^b\ 8^b\ 9^b\ 11^b\ 12^b$ and $13^b$ all correspond respectively to parts 1 2 3 4 5 7 8 9 11 12 and 13 of Fig. 1, in position, shape and function.

The only part that it is necessary to describe is that which lies between the handle sections $13^b\ 13^b$. This is intended to form the sustaining sheet for the eggs, and should lie across the box about midway. This sheet is a projection from the side section 2 and has a rectangular section 20 with octagonal perforations, the sides of each octagon being alternately cut and creased, and the cuts connected with two diagonal cuts in each octagon, as shown. The lips thus formed turn down when the eggs are inserted. The section 20 is separated from the side section $2^b$ by a narrow strip 22, the crease between this strip and the side section $2^b$ being on the same side as those between the other sections of the blank, and the crease between this strip and the perforated section 20 being on the opposite side since the sheet at this fold is flexed in the contrary direction. The division between the section 20 and the narrow strip 22 is indicated by a light dotted line. There are extensions 23 23 24 around the perforated section 20 which fold down to support it.

In forming the box illustrated in Sheet 3, it is first folded at the crease between the side section 2$^b$ and the narrow strip 22 so as to bring the section 20 over until it lies over on the bottom section, then it is folded back, bending at the crease between the section 20 and the strip 22 until the section 20 stands vertically, then the sections 23 23 and 24 are bent in so as to form supports for the perforated section 20, when the side section 2$^b$ is turned up and these sections 23 23 and 24 rest against the bottom. These latter sections support the perforated section at three of its edges. The remaining edge is also kept from sagging since it is suspended from the side 2$^b$ by the strip 22. These sections 23 23 and 24 are preferably a little wider than half the height of the box, so that the perforated section will lie a little above the middle of the box and parallel with the bottom. This section having been folded into place, the other side section 3$^b$ is next folded up and the corner sections 11$^b$ and 12$^b$ are hooked together. Then the end sections are folded up, the handle sections 13$^b$ are slipped through the perforations 10$^b$ and the strips 9$^b$ are turned down. In this form these strips 9$^b$ are made quite narrow since by so doing the width of the blank can be lessened and a considerable saving in stock effected. If they are made wider than the strip 22 it will be necessary in forming up the box to turn them in before the perforated section is turned into place. This completes the box so that it is ready for filling, after which the lid is closed down and the handles laid across the top for shipment as before.

As to the proportions of the various parts necessary to secure the proper fit and the desired centering of the handles, this could be easily worked out by any one skilled in the art, and in addition is shown in the drawings. Owing to the reduced scale to which the blanks are drawn, the slits are for clearness shown wider than would be necessary in practice, but in other respects the drawings are accurately to scale.

The handles are not hooked together during shipment but lie flat on the top and are hooked up by the retailer when the box of eggs is delivered to the consumer.

Although the sections 2 and 3, 2$^a$ 3$^a$, &c., are called side sections, and the sections 4 4, 4$^a$ 4$^a$, &c., are called end sections, it is immaterial which are the sides and which are the ends.

The blanks will be sent from the box factory to the shipper, by whom the boxes will be formed up, when the eggs or other produce are to be packed.

Without limiting myself to the precise details shown, what I claim, and desire to secure by Letters Patent of the United States, is—

1. A blank for a folding-box, of flexible material, made up of a bottom section, sections which fold up to form the sides, corner sections, which are lateral projections from the side sections, handle sections which are longitudinal projections from the corner sections, and sections which fold up to form the ends, the end sections being provided with slits suitably located for the insertion of the handle sections, thus locking the box, the blank being suitably cut and creased between the sections to effect the folds, substantially as described.

2. A blank for a folding-box, of flexible material, made up of a bottom section, sections which fold up to form the sides, interlocking corner sections, which are lateral projections from the side sections, handle sections which are longitudinal projections from the corner sections, and sections which fold up to form the ends, the end sections being provided with slits suitably located for the insertion of the handle sections, thus locking the box, the blank being suitably cut and creased between the sections to effect the folds, substantially as described.

3. A blank for a folding-box, of flexible material, made up of a bottom section, sections which fold up to form the sides, corner sections which are lateral projections from the side sections, handle sections which are longitudinal projections from the corner sections, sections which fold up to form the ends, the end sections being provided with slits suitably located for the insertion of the handle sections, thus locking the box, and folding over sections which are lateral projections from the end sections, and intended to fold inward, the slits lying on the lines between the folding over sections and the end sections, the blank being suitably cut and creased between the sections to effect the folds, substantially as described.

4. A blank for a folding-box, of flexible material, made up of a bottom section, sections which fold up to form the sides, corner sections, which are lateral projections from the side sections, a top section, handle sections which are longitudinal projections from the corner sections, and sections which fold up to form the ends, the end sections being provided with slits suitably located for the insertion of the handle sections, thus locking the box, the blank being suitably cut and creased between the sections to effect the folds, substantially as described.

5. A blank for a folding box, of flexible material, made up of a bottom section, sections which fold up to form the sides, corner sections, which are lateral projections from the side sections, a top section, handle sections which are longitudinal projections from the corner sections, sections which fold up to form the ends, the end sections being provided with slits suitably located for the insertion of the handle sections, thus locking the box, and folding over sections, which are lateral projections from the end sections, and intended to fold inward, the slits lying on the lines between the folding over sections and the end sections, the blank being suitably cut and creased between the sections to effect the folds, substantially as described.

6. A folding-box made up from a blank, of flexible material, consisting of a bottom section, sections which fold up to form the sides, corner sections, which are lateral projections from the side sections, handle sections which are longitudinal projections from the corner sections, and sections which fold up to form the ends, the end sections being provided with slits suitably located for the insertion of the handle sections, thus locking the box, the blank being suitably cut and creased between the sections to effect the folds, substantially as described.

7. A folding-box made up from a blank, of flexible material, consisting of a bottom section, sections which fold up to form the sides, interlocking corner sections, which are lateral projections from the side sections, handle sections which are longitudinal projections from the corner sections, and sections which fold up to form the ends, the end sections being provided with slits suitably located for the insertion of the handle sections, thus locking the box, the blank being suitably cut and creased between the sections to effect the folds, substantially as described.

8. A folding-box made up from a blank, of flexible material, consisting of a bottom section, sections which fold up to form the sides, corner sections which are lateral projections from the side sections, handle sections which are longitudinal projections from the corner sections, sections which fold up to form the ends, the end sections being provided with slits suitably located for the insertion of the handle sections, thus locking the box, and folding over sections which are lateral projections from the end sections, and intended to fold inward, the slit lying on the lines between the folding over sections and the end sections, the blank being suitably cut and creased between the sections to effect the folds, substantially as described.

9. A folding-box made up from a blank, of flexible material, consisting of a bottom section, sections which fold up to form the sides, corner sections, which are lateral projections from the side sections, a top section, handle sections which are longitudinal projections from the corner sections, and sections which fold up to form the ends, the end sections being provided with slits suitably located for the insertion of the handle sections, thus locking the box, the blank being suitably cut and creased between the sections to effect the folds, substantially as described.

10. A folding-box made up from a blank, of flexible material, consisting of a bottom section, sections which fold up to form the sides, corner sections, which are lateral projections from the side sections, a top section, handle sections which are longitudinal projections from the corner sections, sections which fold up to form the ends, the end sections being provided with slits suitably located for the insertion of the handle sections, thus locking the box, and folding over sections which are lateral projections from the end sections, and intended to fold inward, the slits lying on the lines between the folding over sections and the end sections, the blank being suitably cut and creased between the sections to effect the folds, substantially as described.

Signed by me this 14th day of March, 1894.

STEPHEN F. SHERMAN.

In presence of—
 THOMAS EWING, Jr.,
 SAMUEL W. BALCH.